United States Patent
Zurbuchen et al.

[11] Patent Number: 5,875,693
[45] Date of Patent: *Mar. 2, 1999

[54] COMPOSITE RATCHET WRENCH

[75] Inventors: Gregory A. Zurbuchen, Kenosha; Dean J. Iwinski, Muskego, both of Wis.

[73] Assignee: Snap-on Technologies, Inc., Lincolnshire, Ill.

[ * ] Notice: The term of this patent shall not extend beyond the expiration date of Pat. No. 5,271,300.

[21] Appl. No.: 694,811

[22] Filed: Aug. 9, 1996

Related U.S. Application Data

[63] Continuation-in-part of Ser. No. 142,038, Oct. 28, 1993, abandoned.

[51] Int. Cl.$^6$ .................................................. B75B 13/46
[52] U.S. Cl. ............................. 81/63.2; 81/63; 81/177.1; 81/900
[58] Field of Search ................... 81/58, 60–63.2, 81/177.1, 900

[56] References Cited

U.S. PATENT DOCUMENTS

| | | |
|---|---|---|
| 2,720,799 | 10/1955 | Pfost . |
| 2,871,899 | 2/1959 | Coyle et al. ........................... 81/177.1 |
| 2,884,972 | 5/1959 | Harris ................................. 81/177.1 X |
| 2,899,996 | 8/1959 | Stockman ............................. 81/900 X |
| 3,709,073 | 1/1973 | Kurtz . |
| 3,752,202 | 8/1973 | Condon ............................. 81/177.1 X |
| 3,824,881 | 7/1974 | Wright ........................................ 81/63 |
| 3,827,470 | 8/1974 | Douglas et al. ...................... 81/58.3 X |
| 4,023,450 | 5/1977 | Ygfors . |
| 4,058,031 | 11/1977 | Magarian . |
| 4,264,222 | 4/1981 | Bauer . |
| 4,269,387 | 5/1981 | Reynolds et al. . |
| 4,437,365 | 3/1984 | Yaari ................................. 81/177.1 X |
| 4,598,614 | 7/1986 | Kipp . |
| 4,692,294 | 9/1987 | Fisher, III et al. . |
| 4,718,837 | 1/1988 | Frazzell . |
| 4,738,169 | 4/1988 | Wyka . |
| 4,742,735 | 5/1988 | Stencel . |
| 4,770,072 | 9/1988 | Neuhaus . |
| 4,791,837 | 12/1988 | Main ........................................ 81/63.1 |
| 4,986,147 | 1/1991 | Cooper . |
| 4,991,468 | 2/1991 | Lee . |
| 5,062,328 | 11/1991 | Demurger . |
| 5,080,851 | 1/1992 | Flonc et al. . |
| 5,211,669 | 5/1993 | Bonnes et al. . |
| 5,419,221 | 5/1995 | Cole ........................................... 81/60 |

FOREIGN PATENT DOCUMENTS

| | | |
|---|---|---|
| 1251419 | 10/1971 | United Kingdom . |
| 2018179 | 4/1979 | United Kingdom . |

*Primary Examiner*—D. S. Meislin
*Attorney, Agent, or Firm*—Emrich & Dithmar

[57] ABSTRACT

A ratchet wrench includes a body formed entirely of glass-fiber-reinforced plastic material with a gear insert molded therein and a ratchet mechanism mounted on the insert and retained in place by retaining rings. The body includes layers of random discontinuous glass-fiber-reinforced plastic material and a band of unidirectional continuous glass-fiber-reinforced plastic material which are subjected to compression molding around the insert to form a composite wrench structure. Several insert configurations are disclosed.

12 Claims, 3 Drawing Sheets

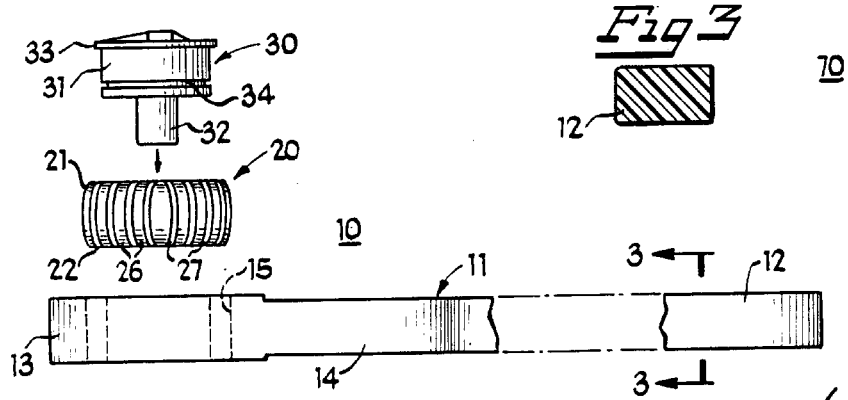
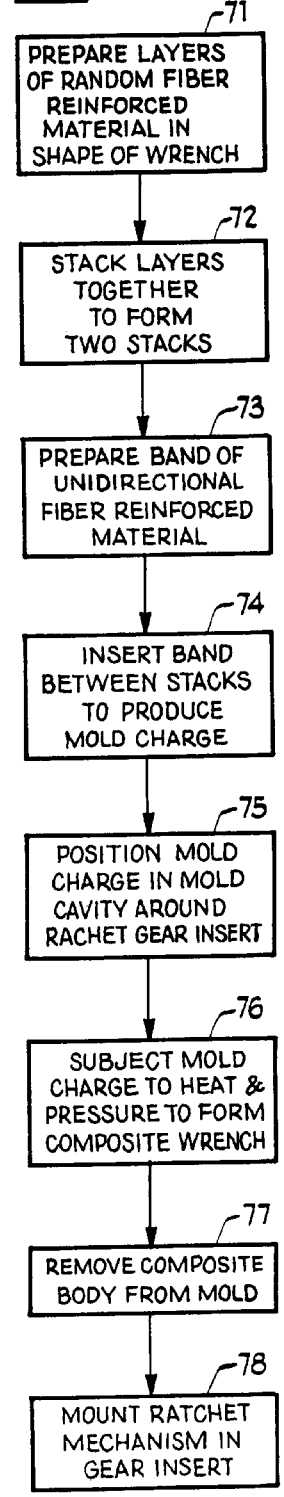
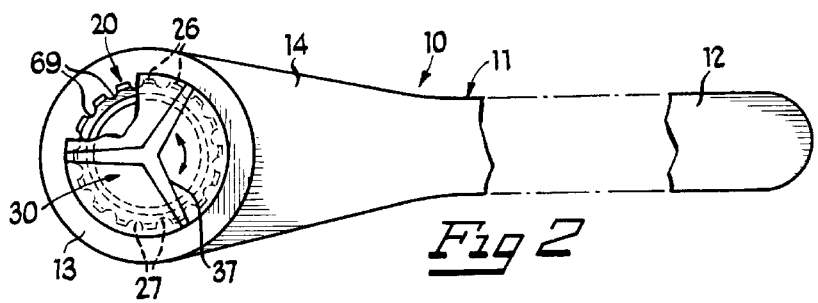
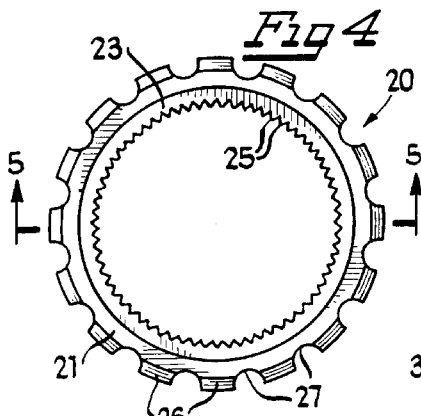
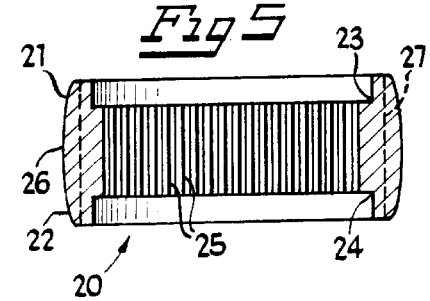
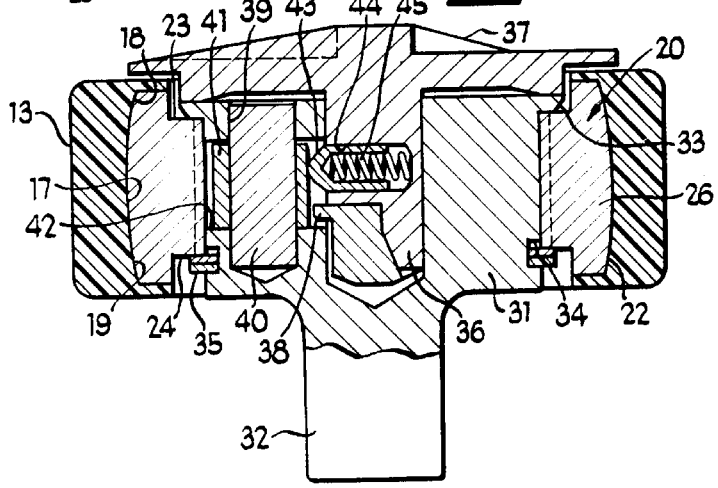

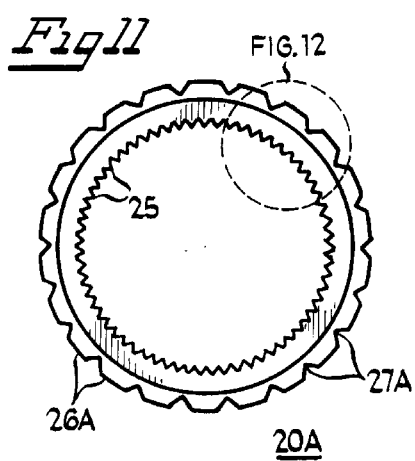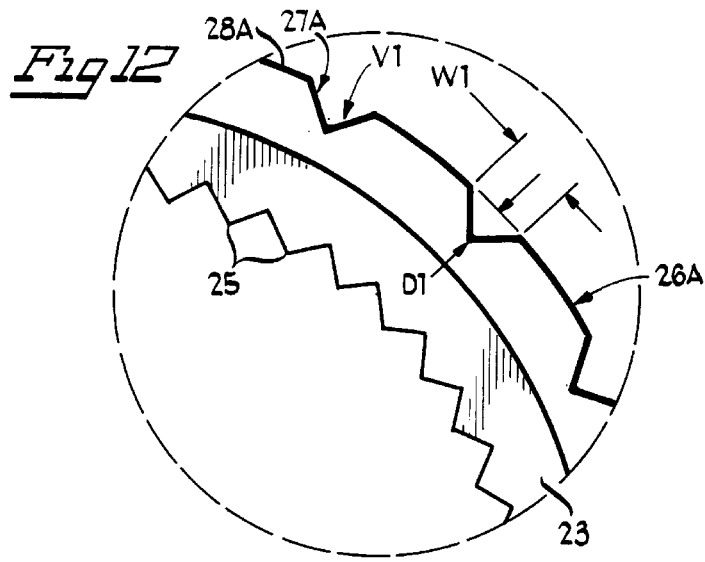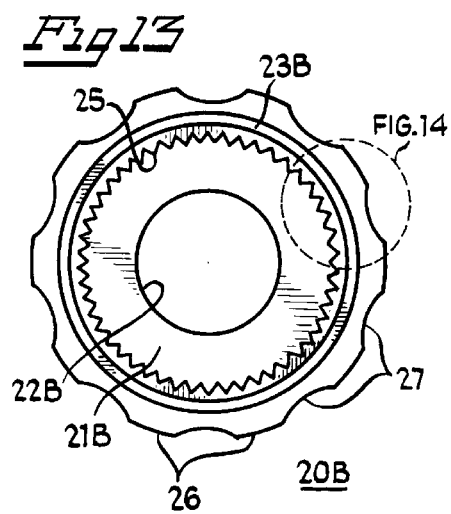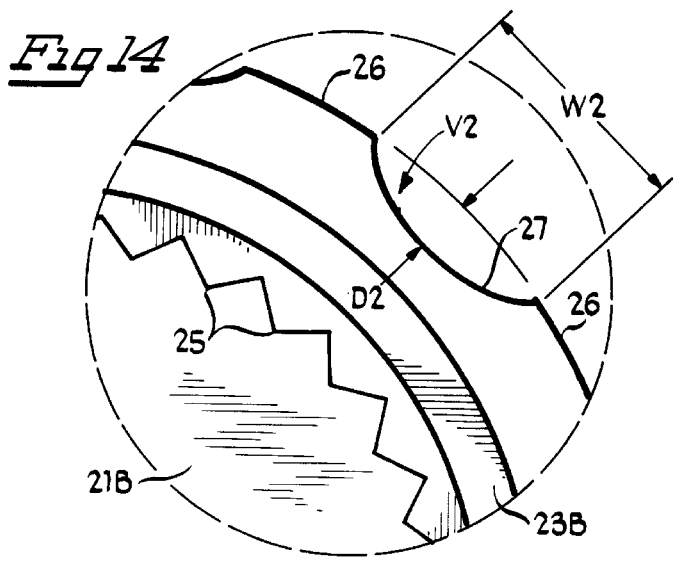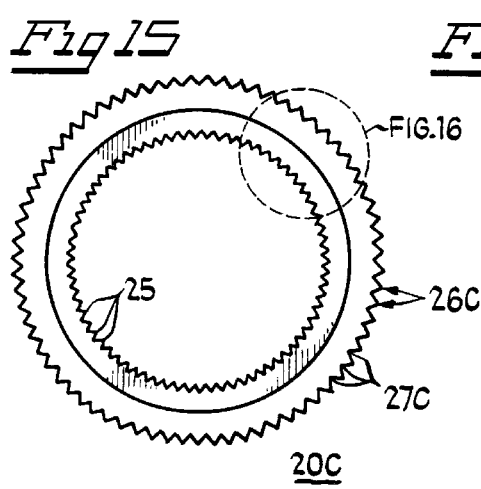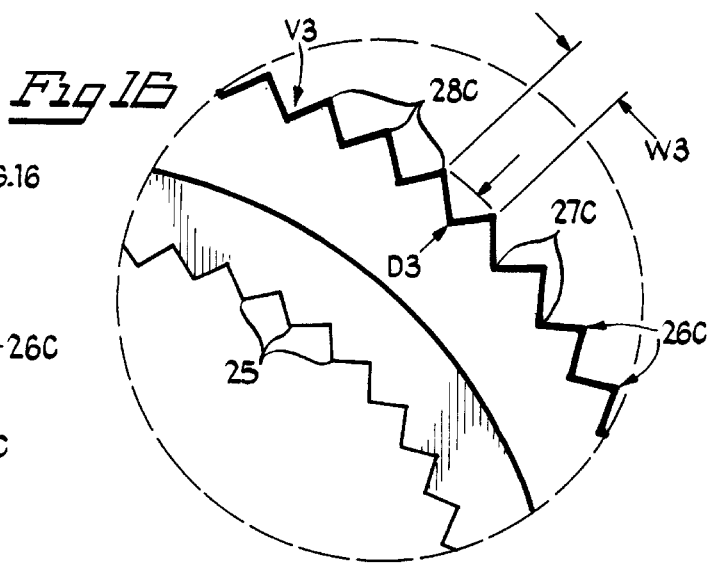

COMPOSITE RATCHET WRENCH

CROSS-REFERENCE TO RELATED APPLICATION

The present application is a continuation-in-part of U.S. application Ser. No. 08/142,038, filed Oct. 28, 1993 now abandoned.

BACKGROUND OF THE INVENTION

1. Field of the Invention

This invention relates to hand tools and the like and, more particularly, to ratcheting hand tools. The invention has particular application to hand tools of the type having non-metallic handle portions. The invention is an improvement of the hand tool disclosed in U.S. Pat. No. 5,271,300.

2. Description of the Prior Art

Conventionally, wrenches and similar hand tools have been made of iron, steel, or some other metal, because of strength and durability requirements. Metal tools are manufactured using machining, casting or forging procedures. An important disadvantage of metal tools is their cost, both from manufacturing and material standpoints. Moreover, metal tools are unsuitable for use in many applications, particularly when a shock hazard condition exists for the user.

The aforementioned U.S. Pat. No. 5,271,300, discloses a composite hand tool which is made entirely of non-metallic material. However, in certain types of hand tools, such as ratchet wrenches, the use of some metal parts may be necessary for satisfactory operation and durability of the tool.

It is known to provide plastic hand tools with metal inserts. One such arrangement is embodied in an open end wrench and is disclosed in U.S. Pat. No. 5,062,328. Another such arrangement is embodied in a box wrench manufactured by Banzai Ltd. of Tokyo, Japan. No such insert-molded tools have heretofore been produced, however, utilizing movable parts.

SUMMARY OF THE INVENTION

It is a general object of the invention to provide an improved composite hand tool which avoids the disadvantages of prior hand tools while affording additional structural and operating advantages.

An important feature of the invention is the provision of a ratchet hand tool which is formed entirely of non-metallic material except for the ratcheting apparatus.

In connection with the foregoing feature, a further feature of the invention is the provision of a ratchet hand tool of the type set forth which is of relatively simple and economical construction.

Another feature of the invention is the provision of a method for forming a ratchet hand tool of the type set forth.

Certain ones of these and other features of the invention are attained by providing a ratchet hand tool comprising: a body formed totally of non-metallic material and including a handle portion and a head portion, a gear insert embedded in the head portion, the insert having an axis and an outer side surface with a plurality of spaced recesses formed therein extending substantially parallel to the axis and filled with the non-metallic material of the body, and a ratchet mechanism carried by the insert for ratcheting engagement therewith.

Others of these features are attained by providing a ratchet hand tool comprising: a body formed totally of non-metallic material and including a handle portion and a head portion, a gear insert embedded in the head portion, the insert having an axis and an outer side surface with a plurality of spaced recesses formed therein and filled with the non-metallic material of the body, each of the recesses having a depth of at least 0.015 inch, and a ratchet mechanism carried by the insert for ratcheting engagement therewith.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side-elevational, partially exploded view of a ratchet wrench in accordance with the present invention with portions broken away;

FIG. 2 is a top plan view of the wrench of FIG. 1, with portions broken away;

FIG. 3 is view in vertical section taken along the line 3—3 in FIG. 1;

FIG. 4 is an enlarged, top plan view of the gear insert of the wrench of FIG. 1;

FIG. 5 is a view in vertical section taken along the line 5—5 in FIG. 4;

FIG. 6 is a further enlarged view of the head of the ratchet wrench of FIG. 1 in partial vertical section;

FIG. 10 is a flow chart of the steps in the process of making the ratchet wrench of FIGS. 1 and 2;

FIG. 11 is a view, similar to FIG. 4, of another embodiment of gear insert in accordance with the present invention;

FIG. 12 is an enlarged, fragmentary view of the portion of the gear insert of FIG. 11 designated by the circle 12 therein;

FIG. 13 is a view, similar to FIG. 4, of yet another embodiment of gear insert in accordance with the present invention;

FIG. 14, is an enlarged, fragmentary view of a portion of the gear insert of FIG. 13 designated by the circle 14 therein;

FIG. 15 is a view similar to FIG. 4 of yet another embodiment of gear insert in accordance with the present invention; and FIG. 16 is an enlarged, fragmentary view of a portion of the gear insert of FIG. 15, designated by the circle 16 therein.

DESCRIPTION OF THE PREFERRED EMBODIMENTS

Figure 7:
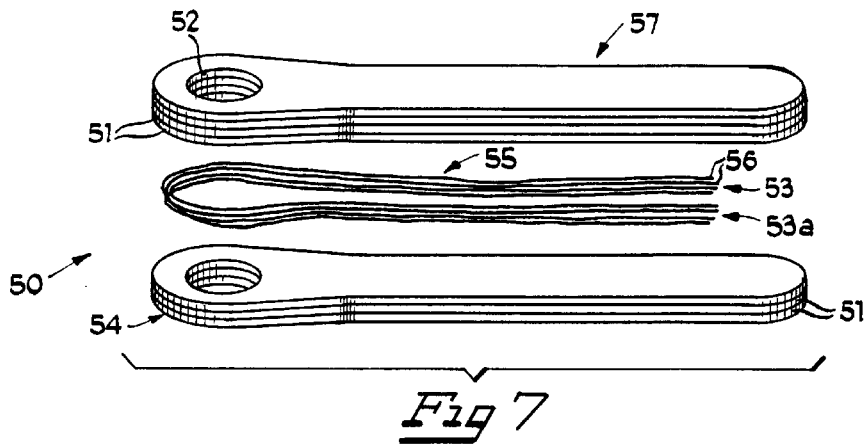
FIG. 7 is an exploded perspective view of the mold charge for forming the body of the wrench of FIG. 1.

Referring to FIGS. 1–3, there is illustrated a ratchet wrench, generally designated by the numeral 10, constructed in accordance with the present invention. The ratchet wrench 10 has a body 11 of unitary, one-piece construction substantially rectangular in transverse cross section. The body 11 includes an elongated handle portion 12 and an annular head portion 13 and a tapered neck portion 14 interconnecting the handle portion 12 and the head portion 13. Formed coaxially through the head portion 13 is a cylindrical opening 15. The opening 15 has tapered, frustoconical surface portions 18 and 19 (see FIG. 6), respectively, at the opposite ends thereof adjacent to the opposite faces of the head portion 13, each of the surfaces 18 and 19 converging toward the adjacent face of the head portion 13. The body 11 is formed entirely of different types of glass-fiber-reinforced plastic material and is produced using a compression molding process, as will be explained more fully below.

Referring also to FIGS. 4–6, the ratchet wrench 10 includes an annular gear insert 20, having an outer surface which is curvilinear is an axial direction, being provided with rounded portions 21 and 22, respectively adjacent to the opposite ends thereof. If desired, the rounded portions 21 and 22 could be in the nature of frustoconical bevels. Alternatively, the outer surface of the gear insert 20 could be a circularly cylindrical surface, having the same diameter along its entire axial extent. The insert 20 is disposed in the opening 15 of the body 11 coaxially therewith and is embedded therein by insert molding, as will be explained more fully below. As can be seen in FIG. 6, the body 11 is molded around the insert 20 to form the surfaces 18 and 19, which respectively cooperate with the portions 21 and 22 on the insert 20 for securely holding the insert 20 in place and preventing axial movement thereof relative to the head portion 13. Formed in the insert 20, respectively at the opposite ends thereof, are top and bottom annular recesses 23 and 24. The inner surface of the insert 20, which has a diameter less than that of the annular recesses 23 and 24, is provided around the entire circumference thereof with gear teeth 25. The outer surface of the gear insert 20 has a fluted or scalloped construction, defining a plurality of alternating radially outwardly extending projections 26 and radially inwardly projecting recesses or scallops 27 substantially equiangularly spaced apart. It will be appreciated that, during the molding of the body 11, the mold charge fills the recesses 27 for cooperation with the projections 26 securely to lock the gear insert 20 against rotational movement about its axis relative to the head portion 13.

Referring now also to FIGS. 11 and 12, there is illustrated a gear insert generally designated by the numeral 20A in accordance with another embodiment of the invention, which is substantially the same as the gear insert 20, except for the configuration of the outer circumferential surface. Accordingly, that outer surface will be described in detail. More specifically, the outer surface of the gear insert 20A has a recessed construction, defining a plurality of alternating radially outwardly extending projections 26A and radially inwardly projecting valleys or recesses 27A substantially equiangularly spaced apart. Each of the projections 26A has a broad, part-cylindrical outer end surface 28A, the length of which will depend upon the number of the valleys 27A. The valleys 27A may be formed by broaching and, in the preferred embodiment, are 22 in number, although it will be appreciated that other numbers of valleys 27A could be provided. Each of the valleys 27A is generally V-shaped in transverse cross section and has a depth D1 measured radially at the apex, a width W1 measures circumferentially at the outer periphery of the gear insert 20A, and a volume V1, which is the transverse cross-sectional area of the valley multiplied by its axial length or extent. If the volumes V1 of all of the valleys 27A are added, they produce a cumulative volume VC1. It will be appreciated that, during the molding of the body 11, the mold charge fills the valleys 27A for cooperation with the projections 26A securely to lock the gear insert 20A against rotational movement about its axis relative to the head portion 13.

Referring now to FIGS. 13 and 14, there is illustrated a gear insert 20B which, again, is similar to the gear insert 20. In this case, the outer peripheral surface is substantially the same as the outer surface of the gear insert 20 except that, in this case, the projections 26 and scallops or recesses 27 are 10 in number rather than 16. It will be appreciated that, if desired, other numbers of projections and scallops could also be provided. As is indicated in FIG. 14, each of the recesses or scallops of the gear insert 20B has a depth D2 as measured radially from the outer periphery of the gear insert 20A, a maximum width W2 between the adjacent projections 26, as measured circumferentially along the outer periphery of the gear insert 20B, and a volume V2, the accumulated volume of all of the recesses or scallops 27 being designated VC2. The insert 20B has a circular end wall 21B at one end thereof having a circular opening 22B formed axially therethrough. An enlarged diameter counterbore 23B may be formed at the other end of the insert. In operation, the gear insert 20B functions in the same manner as the gear insert 20 described above.

Referring now also to FIGS. 15 and 16, there is illustrated a gear insert 20C which is substantially the same as the gear insert 20, except for the configuration of the outer peripheral surface thereof. More particularly, the outer surface of the gear insert 20C has a toothed construction, which is preferably formed by a straight knurl, resulting in a plurality of alternating radially outwardly extending teeth or projections 26C and radially inwardly extending valleys or recesses 27C substantially equiangularly spaced apart. Preferably, the teeth or projections 26C are provided with sharp crests 28C and the valleys 27C are substantially V-shaped in transverse cross section. In a preferred embodiment, the knurl is sized so as to produce substantially 30 teeth 26C per linear inch along the outer circumference of the gear insert 20C, although it will be appreciated that other numbers of teeth could be provided. Referring to FIG. 16, each of the valleys or recesses 27C has a depth D3 measured radially at its apex, a maximum width W3 between adjacent tooth crests as measured circumferentially along the outer periphery of the gear insert 20C and a volume V3, with the accumulated total volume of all of the valleys 27C being designated VC3. It will be appreciated that, during the molding of the body 11, the mold charge fills the valleys or recesses 27C for cooperation with the teeth or projections 26C, securely to lock the gear insert 20C against rotational movement about its axis relative to the head portion 13. While the teeth 26C preferably have sharp crests 28C, they could be provided with slightly rounded or radiused crests, if desired. In general, it is believed that the sharp crests provide greater antirotational gripping force, while rounded crests may tend to reduce stress concentrations in the composite material.

TABLE I

| Gear Insert | (1) Recess Depth (D) (Inch) | (2) Total Volume (VC) Within Recesses (Inches Cubed) | (3) Width of Composite at Periphery- per Tooth (W)/ Cumulative Composite Width (WC) | (4) Ratio - Cumulative Composite Width (WC) to Insert Circumference |
|---|---|---|---|---|
| 20A FIGS. 11–12 | 0.033 | 0.0147 | .066/1.452 | 0.37 |
| 20B FIGS. 13–14 | 0.040 | 0.0348 | .214/2.14 | 0.54 |
| 20C FIGS. 15–16 | 0.015 | 0.0432 | .030/3.51 | 0.89 |

Table I tabulates, for each of the gear inserts 20A–20C of FIGS. 11–16, certain dimensional parameters of the recesses, for a gear insert having an outer peripheral circumference of 3.927 inches and an axial length of 0.574 inch. In particular, Table I tabulates the recess depth (D), the total or cumulative volume (VC) within all of the recesses, the width of composite in each recess, which corresponds to the maximum width (W) of the recess, as well as the cumulative composite width (WC) for all of the recesses, and the ratio of the cumulative composite width to the outer circumference of the gear insert. It will be appreciated that the total volume (VC) of composite in the recesses is a function of the size of the each recess and the total number of recesses. The total anti-rotational gripping force is proportional to this total volume figure. For this particular size of gear insert, applicant believes that the individual recess depth (D) should be in the range of from about 0.015 inch to about 0.05 inch, that the lower limit for the total volume of composite within all of the recesses is approximately 0.014 cubic inches, and that the ratio between the cumulative maximum composite width in the recesses (WC) to the insert outer circumference should not be less than 0.35. In general, the recess depth (D) is inversely proportional to the number of recesses, and it is believed that the 30 tooth-per-inch number for the gear insert 30C, which corresponds to approximately 117 teeth for the size of gear insert specified, represents the probable upper limit for the number of teeth or projections.

Referring in particular to FIGS. 1 and 6, the ratchet wrench 10 also includes a ratchet mechanism 30 which is mounted coaxially within the gear insert 20. (Hereinafter, all references to the insert 20, or parts thereof will be understood to apply also to any of the inserts 20A, 20B or 20C and corresponding parts thereof.) More specifically, the ratchet mechanism 30 has a generally cylindrical body 31 provided at one end thereof with an axially extending drive lug 32, which may be substantially square in transverse cross section. The body 31 is provided at its other end with a radially outwardly extending annular flange 33. Formed in the outer surface of the body 31 adjacent to the drive lug 32 is a circumferential groove 34. In assembly, the body 31 is inserted into the insert 20 in the direction of the arrow in FIG. 1, until the flange 33 engages the bottom of the recess 23. Then, a retaining ring 35, such as a split ring, is inserted in the groove 34 for engagement with the bottom of the bottom recess 24 with the annular flange 33 to lock the body 31 against axial movement relative to the gear insert 20.

The body 31 has an axial bore formed in the end thereof opposite the drive lug 32 and in which is received a reversing rotor 36, provided at the outer end thereof with a lever handle 37 which is disposed along the outer face of the body 31. The rotor 36 is pivotally movable about its axis between forward and reverse positions, its pivotal movement being limited by the operation of a finger 38 which projects into a cavity of limited angular extent in the body 31.

The body 31 is also provided with a cylindrical bore 39 formed in the face thereof opposite the drive lug 32 and substantially parallel to the central bore for the reversing rotor 36. Disposed in the bore 39 is a pivot pin 40 on which is mounted a pawl 41 which is seated in a radial cavity 42 formed in the outer surface of the body 31. A hollow cylindrical plunger 43 is disposed in a radial bore 44 in the reversing rotor 36 and has a conical outer end and which projects into the cavity 42 and bears against the rear end of the pawl 41, being resiliently urged into engagement therewith by a helical compression spring 45 seated in the plunger 43 and the bore 44.

In operation, when the reversing rotor 36 is in its forward position, the plunger 43 holds a first set of teeth on the pawl 41 in meshing engagement with the gear teeth 25 on the insert 20 for accommodating ratcheting movement in one direction. When the reversing rotor 36 is in the reverse position, the plunger 43 holds a second set of teeth on the pawl 41 in engagement with the gear teeth of the gear insert 20, accommodating ratcheting movement in the opposite direction, all in a known manner.

Figure 8:
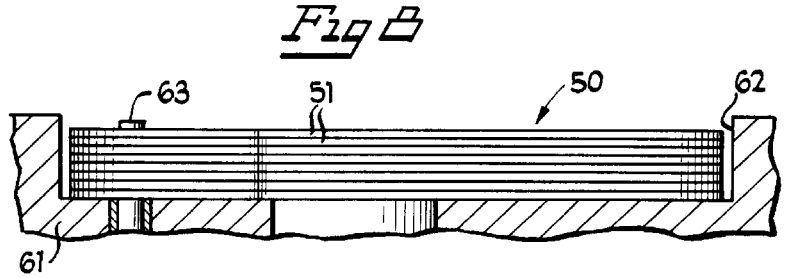
FIG. 8 is a fragmentary view in vertical section of a compression mold cavity with the mold charge of FIG. 7 and the gear insert of FIG. 4 disposed therein.
Figure 9:
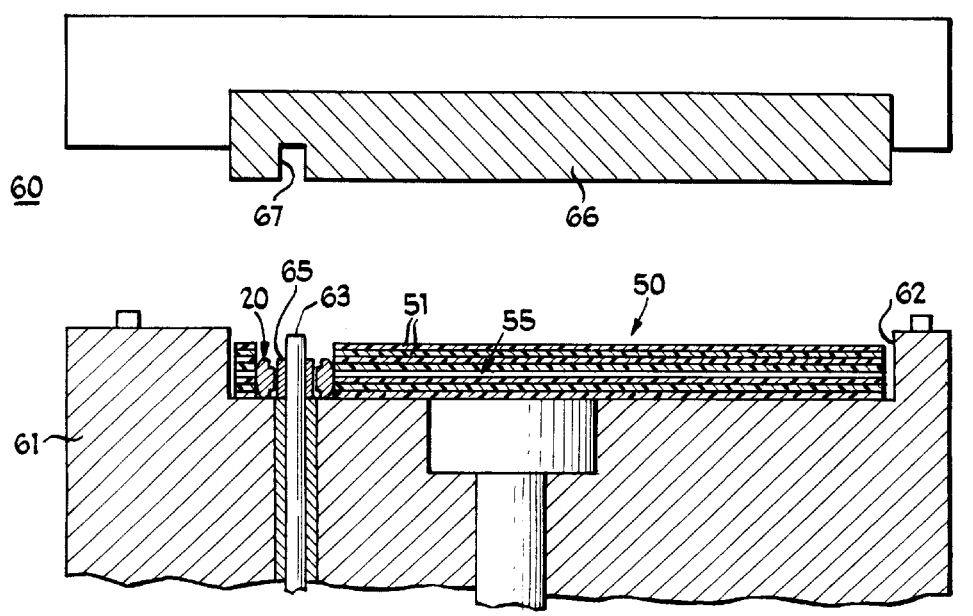
FIG. 9 is a fragmentary view in vertical section of a compression mold apparatus in its open condition preparatory to compression molding of the body of the hand tool of FIG. 1.

Referring now also to FIGS. 7–9, the molding of the body 11 will be described in greater detail. In FIG. 7 there is illustrated a mold charge, generally designated by the numeral 50, which is adapted to be placed in a mold apparatus 60 (FIGS. 8 and 9) for each mold cycle to form the body 11. The body 11 is compression molded entirely from glass-fiber-reinforced thermoset polymer matrix sheet molding compounds. The glass-fiber-reinforcement is utilized in both chopped or discontinuous random form and in continuous unidirectional form. Preferably, the thermoset polymer matrix molding material is vinyl ester, because this material offers significant processing advantages including fast cure rate and workability. However, the body 11 could be made of glass-fiber-reinforced epoxy materials or other plastics.

The mold charge 50 is formed primarily of a plurality of layers 51, each individually die cut in the general shape of the ratchet wrench 10 from a sheet of sheet molding compound, each layer 51 having a circular hole 52 cut in the head end thereof. Each of the layers 51 is formed of a chopped random-oriented glass-fiber-reinforced vinyl ester material, hereinafter referred to as random-fiber-reinforced material. In preparing the mold charge 50, a first plurality of the layers 51 is stacked in a substantially congruent arrangement to form a first stack 54. The mold charge 50 further includes a reinforcement portion in the form of a band 55, which extends substantially around the periphery of the wrench 10 and which is made of unidirectional, continuous glass-fiber-reinforced vinyl ester material, hereinafter referred to as unidirectional-fiber-reinforced material. The band 55 is formed from a plurality of strips 56 of the unidirectional-fiber-reinforced material and is laid over the first stack 54, extending from a first free end 53 up along one side of the stack around the hole 52 and back down the other side, terminating in a second free end 53a adjacent to the free end 53. The remaining layers 51 of the mold charge 50 are then stacked in a congruent manner to form a second stack 57, which is laid on top of the band 55 congruent with the first stack 54 to form the completed mold charge 50.

As is explained in greater detail in the aforementioned U.S. Pat. No. 5,271,300, when used together in a composite wrench, the two compounds of the layers 51 and the band 55 complement each other. The random-fiber-reinforced material of the layers 51, which forms the bulk of the wrench structure, insures that an adequate level of isotropy exists in order to handle multi-directional loading. The unidirectional-fiber-reinforced material of the band 55 allows for tailoring of local and direct strength and stiffness within the wrench structure.

The body 11 is compression molded using compression molding apparatus 60 including a hydraulic press. The molding apparatus 60 includes a female member 61, which defines a mold cavity 62 provided with a core pin 63 adapted to fit through the hole 52 of the mold charge 50. A ratchet plug 65 is fitted over the core pin 63 and the gear insert 20 is then fitted over the plug 65, with the gear teeth 25 of the insert 20 meshing with mating teeth on the periphery of the plug 65. The molding apparatus 60 also includes a male member 66 having a recess 67 therein for respectively receiving the upper end of the core pin 63.

Referring also to FIG. 10, the method of forming the ratchet wrench 10 will now be explained in connection with the flow chart 70 outlining the method steps. Initially, at step 71, the individual layers 51 of the random-fiber-reinforced material are die cut from the associated sheets of sheet molding compound in the general shape of the ratchet wrench 10. Next, at step 72, a first plurality of the layers 51 are stacked together to form the first stack 54 and the second group of layers 51 is stacked to form the second stack 57. Next, at step 73, the strips of unidirectional-fiber-reinforced material are gathered to form the band 55. Then, at step 74, the band 55 is inserted between the first and second stacks 54 and 57 to form the mold charge 50. Next, at step 75, the mold charge 50 is positioned in the mold cavity 62, with the hole 52 fitted over the gear insert 20, as is illustrated in FIGS. 8 and 9. Preferably the mold charge 50 is slightly smaller than the outline of the mold cavity 62 to permit the mold charge 50 to lie flat in the cavity 62, but the mold charge 50 preferably has a thickness slightly greater than the intended thickness of the finished body 11 to allow the mold charge 50 to flow to fill the mold cavity 62 during the molding operation.

Next at step 76, the molding apparatus 60 is closed, subjecting the mold charge 50 to heat and pressure to form the body 11. Then, at step 77, the finished body 11 is removed from the mold. The molding apparatus 60 may also be provided with suitable stop pins and ejector bars to limit the depth of closure of the molding apparatus 60 and to facilitate ejection of the finished body 11 from the mold cavity 62, all as is explained in greater in the aforementioned U.S. Pat. No. 5,271,300.

While the bulk of the mold charge 50 is made from a plurality of layers 51 of the random-fiber-reinforced material, the finished molded body 11 is ostensibly a single layer composite of unitary construction, containing both discontinuous-fiber reinforcement in random orientation and continuous-fiber reinforcement in a controlled orientation. It will be appreciated that, during the molding operation, the mold charge 50 flows to fill the cavity 62 and to fill the recesses 27 around the periphery of the gear insert 20, and to cover the outer surfaces 21 and 22 on the gear insert 20. Thus, it will be appreciated that the finished body 11 has plastic projections 69 (see FIG. 2) which alternate with the gear insert projections 26. There results a construction wherein the gear insert 20 is firmly embedded in the head portion 13 of the body 11 and is rigidly constrained against axial or rotational movement relative thereto.

After the body 11 has been molded, the ratchet mechanism 30 is mounted therein by inserting it in the gear insert 20, as described above, and securing it in place with the retaining ring 35, as at step 78.

Because the plastic materials used the make the body 11 include no metallic components, it is non-conductive. Thus, although the ratchet wrench 10 includes a metal gear insert 20 and metallic ratchet mechanism 30, during operation, when the user's hand is on the handle portion 12, the user is effectively protected from shock hazard. Also, the plastic composition of the body 11 results in its being corrosion resistant, non-marring, non-sparking and lightweight.

From the foregoing, it can be seen that there has been provided an improved ratchet wrench which is of simple and economical construction, is effectively non-conducting to protect the user from shock hazard and which is characterized by lightweight construction and ease of assembly.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A ratchet hand tool comprising:
   a body having a length and a width and formed totally of non-metallic material and including a handle portion and a head portion,
   said non-metallic material including a core formed of discontinuous glass-fiber-reinforced plastic material disposed in random orientation and extending said length and said width, and a band formed of continuous glass-fiber-reinforced plastic material disposed in a controlled orientation and extending around a portion of the periphery of said core;
   a gear insert embedded in said head portion,
   said insert having an axis and an outer side surface with a plurality of spaced recesses formed therein extending substantially parallel to the axis and filled with the non-metallic material of the body; and
   a ratchet mechanism carried by said insert for ratcheting engagement therewith.

2. The hand tool of claim 1, wherein each of said recesses is part-circular in transverse cross section.

3. The hand tool of claim 1, wherein each of said recesses is V-shaped in transverse cross section.

4. The hand tool of claim 3, wherein each of said recesses has radially inwardly converging sloping side surfaces, wherein each said side surfaces, intersects a side surface of an adjacent recess to form a projection having a sharp crest.

5. The hand tool of claim 1, wherein each of said recesses has a maximum width at said outer side surface measured circumferentially of said surface such that the ratio of the cumulative total of the maximum widths of all of said recesses to the circumference of said outer side surface is in the range of from about 0.35 to about 0.90.

6. The tool of claim 1, wherein said insert is annular in shape and is provided with gear teeth around the inner periphery thereof, said ratchet mechanism being disposed coaxially through said insert for ratcheting engagement with said gear teeth, and further comprising retaining means on said ratchet mechanism engageable with insert for preventing axial movement of said ratchet mechanism relative to said insert.

7. The tool of claim 1, wherein the total volume of all of said recesses is at least 0.0147 cubic inch.

8. The hand tool of claim 7, wherein each of said recesses has a depth of at least 0.015 inch.

9. The hand tool of claim 8, wherein each of said recesses has a maximum width at said outer side surface as measured circumferentially of said outer side surface, said maximum width being in the range of from about 0.030 inch to about 0.215 inch.

10. The hand tool of claim 8, wherein each of said recesses has a maximum width at said outer side surface as measured circumferentially of said outer side surface, the cumulative total of the maximum widths of all of said recesses being in the range of from about 1.45 inch to about 3.51 inches.

11. The hand tool of claim 10, wherein the ratio of the cumulative total of said maximum widths for all of said recesses to the circumference of said outer side surface is in the range of from about 0.35 to about 0.90.

12. The hand tool of claim 8, wherein said recesses have a cumulative total volume of at least 0.0147 cubic inch.

* * * * *